R. WOLF.
SNOW SHOVEL.
APPLICATION FILED FEB. 13, 1908.

925,789.

Patented June 22, 1909.
2 SHEETS—SHEET 1.

Attest.
E. M. Harrington
M. Smith

Inventor:
Rudolph Wolf.
By Higdon Longan
ATTYS.

THE NORRIS PETERS CO., WASHINGTON, D. C.

R. WOLF.
SNOW SHOVEL.
APPLICATION FILED FEB. 13, 1908.
925,789.
Patented June 22, 1909.
2 SHEETS—SHEET 2.
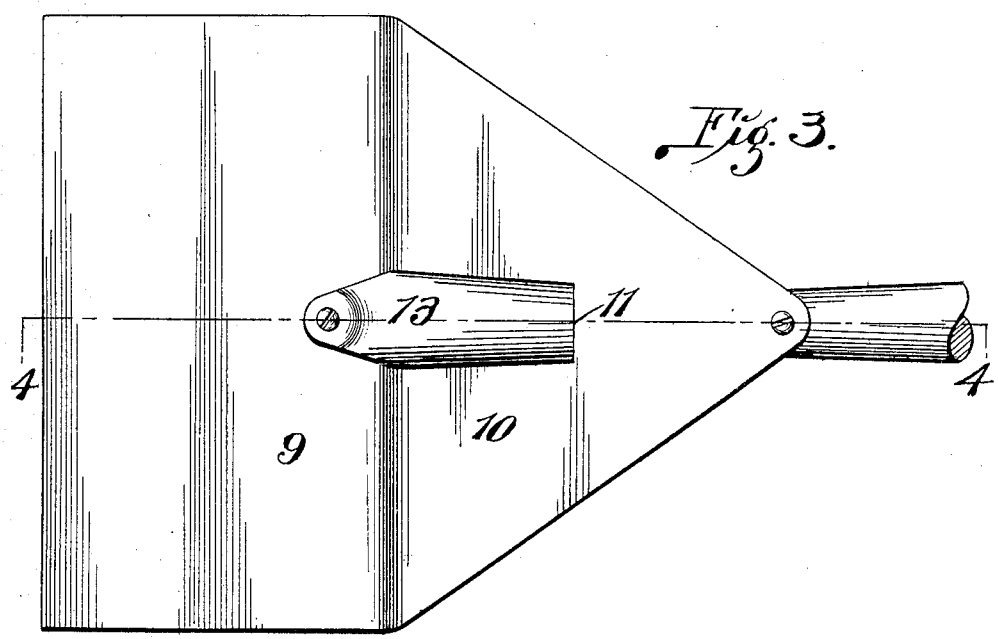
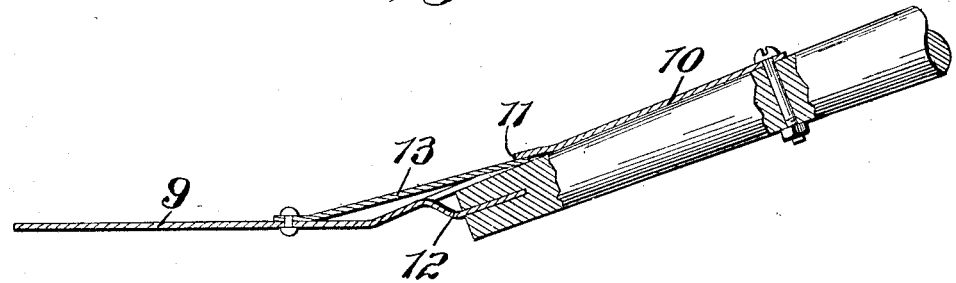
Attest:
E. M. Harrington
M. P. Smith
Inventor:
Rudolph Wolf.
By Higdon Longan
Attys.

UNITED STATES PATENT OFFICE.

RUDOLPH WOLF, OF ST. LOUIS, MISSOURI.

SNOW-SHOVEL.

No. 925,789.  Specification of Letters Patent.  Patented June 22, 1909.

Application filed February 13, 1908. Serial No. 415,748.

*To all whom it may concern:*

Be it known that I, RUDOLPH WOLF, a citizen of the United States, and resident of St. Louis, Missouri, have invented certain new and useful Improvements in Snow-Shovels, of which the following is a specification containing a full, clear, and exact description, reference being had to the accompanying drawings, forming a part hereof.

My invention relates to a snow shovel, the particular object of my invention being to construct a shovel wherein a very rigid and strong connection is formed between the body of the shovel and the handle, thus overcoming any tendency of the body of the shovel to break at the point where the same is attached to the handle.

To the above purposes, my invention consists in certain novel features of construction and arrangement of parts, which will be hereinafter more fully set forth, pointed out in the claims, and illustrated in the accompanying drawings, in which:—

Figure 1:
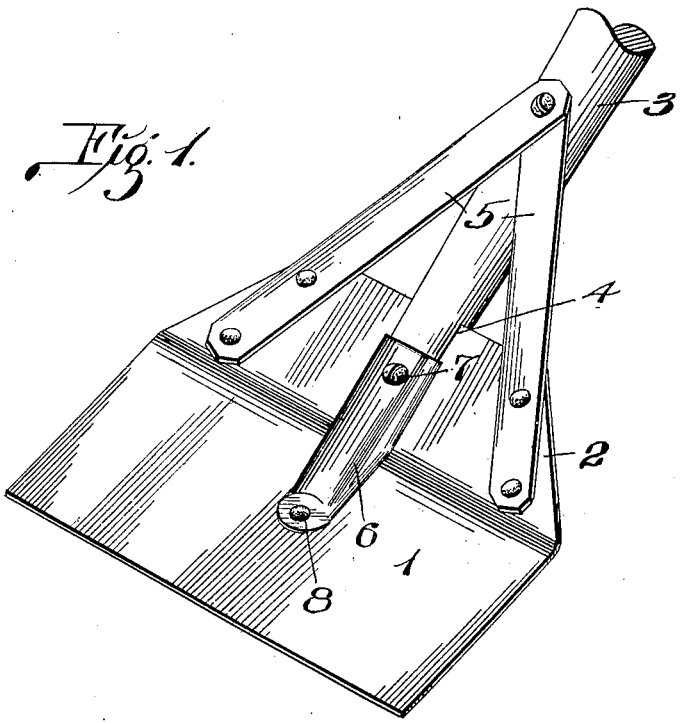
Figure 2:
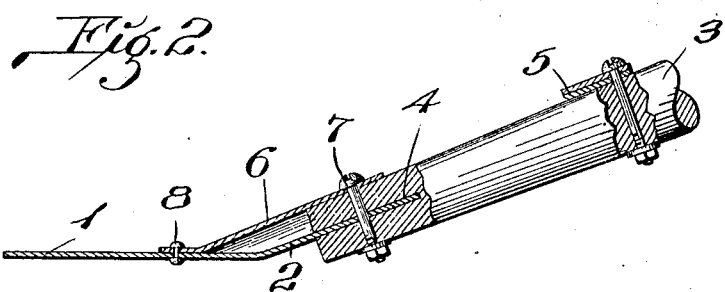

Figure 1 is a perspective view of a snow shovel of my improved construction, with the handle thereof broken away; Fig. 2 is a side elevation of a snow shovel of my improved construction, with parts thereof, shown in vertical section; Fig. 3 is a plan view of a modified form of the shovel; Fig. 4 is a section taken approximately on the line 4—4 of Fig. 3.

Referring by numerals to the accompanying drawings:—1 designates the body of the shovel, which is preferably constructed of suitable sheet metal, rectangular in outline, and provided on its rear edge with an extension 2, which is bent upward at a slight angle relative to the body 1.

3 designates the handle, the lower end of which is provided with a slot 4, in order that it may be fitted onto the central portion of the extension 2; and rigidly fixed in any suitable manner to the extension 2, at the sides thereof, are the lower ends of braces 5, the upper ends of which are rigidly fixed in any suitable manner to the handle 3.

Fitting snugly over that portion of the lower end of the handle that lies on top of the extension 2 is a reinforcing plate of metal 6, and passing through the upper end thereof, and through the handle 3 and extension 2, is a screw or bolt 7. The lower end of this reinforcing plate is extended onto the top surface of the body 1 of the shovel, and the two parts are rigidly connected by means of a rivet 8, or similar fastening device. The braces 5 and plate 6 equalize and distribute the strain between the body of the shovel and the handle thereof while the device is in use, and therefore reduce the liability of breakage between the body and the handle to a minimum.

In the modified form of the shovel seen in Figs. 3 and 4, the body 9 of the shovel is provided at its rear side with a triangular extension 10, in the center of which is formed a transverse slot 11; and the metal immediately in front of this slot is pressed downward, as designated by 12, to receive the slotted lower end of the handle; and, in this construction, the upper end of a brace 13 is fitted through the slot 11, and the lower end of said brace being fixed to the rear portion of the body 9.

I claim:—

1. A snow shovel, comprising a shovel body, a handle, the lower end of which is slotted and fitted onto the rear portion of the shovel body, a reinforcing plate arranged over the lower end of the handle, means whereby said reinforcing plate is fixed to the handle and to the shovel body, and braces extending from the rear corners of the shovel body to the handle.

2. A snow shovel, comprising a shovel body, a handle, the lower end of which is slotted and fitted into the rear portion of the shovel body, a reinforcing plate arranged over the lower end of the handle, and means whereby said reinforcing plate is fixed to the handle and to the shovel body.

3. A snow shovel, comprising a shovel body, an extension integral with the rear portion thereof and which extension is bent upward at a slight angle relative the main body portion, a handle, the lower end of which is slotted and fitted onto the upwardly bent extension of the body, a reinforcing plate arranged over the lower end of the handle, means whereby said reinforcing plate is fixed to the handle and to the shovel body, and braces extending from the rear corners of the shovel body to the handle.

4. A snow shovel, comprising a shovel body, an inclined extension integral with the rear portion of said shovel body, a handle provided with a slot in its lower end and which slotted end engages the inclined portion of the shovel body, and a reinforcing plate inclosing the upper half of the slotted lower end of the handle and means whereby said reinforcing plate is fixed to the shovel body.

In testimony whereof, I have signed my name to this specification, in presence of two subscribing witnesses.

RUDOLPH WOLF.

Witnesses:
M. P. SMITH,
E. L. WALLACE.